United States Patent
Oda

(10) Patent No.: US 8,923,361 B2
(45) Date of Patent: Dec. 30, 2014

(54) PROTECTION CONTROL APPARATUS

(75) Inventor: Shigetoo Oda, Tokyo (JP)

(73) Assignee: Mitsubishi Electric Corporation, Chiyoda-Ku, Tokyo (JP)

( * ) Notice: Subject to any disclaimer, the term of this patent is extended or adjusted under 35 U.S.C. 154(b) by 0 days.

(21) Appl. No.: 14/350,574

(22) PCT Filed: Oct. 13, 2011

(86) PCT No.: PCT/JP2011/073580
§ 371 (c)(1),
(2), (4) Date: Apr. 9, 2014

(87) PCT Pub. No.: WO2013/054423
PCT Pub. Date: Apr. 18, 2013

(65) Prior Publication Data
US 2014/0270027 A1    Sep. 18, 2014

(51) Int. Cl.
*H04B 1/713* (2011.01)
*H04L 7/00* (2006.01)

(52) U.S. Cl.
CPC .................... *H04L 7/0016* (2013.01)
USPC ........................................................ 375/133

(58) Field of Classification Search
USPC .................................................. 375/132–137
See application file for complete search history.

(56) References Cited

U.S. PATENT DOCUMENTS

| | | | | |
|---|---|---|---|---|
| 2002/0027430 A1* | 3/2002 | Eto | ............ | 324/76.53 |
| 2006/0244862 A1* | 11/2006 | Yamashita | ............ | 348/473 |
| 2009/0219067 A1* | 9/2009 | Kizer | ............ | 327/156 |

FOREIGN PATENT DOCUMENTS

| | | |
|---|---|---|
| JP | 63-214676 A | 9/1988 |
| JP | 5-83841 A | 4/1993 |
| JP | 7-59251 A | 3/1995 |
| JP | 7-193981 A | 7/1995 |
| JP | 9-215171 A | 8/1997 |
| JP | 2000-78740 A | 3/2000 |
| JP | 2009-095097 A | 4/2009 |
| JP | 2009-300128 A | 12/2009 |
| JP | 2011-133256 A | 7/2011 |
| JP | 2011-135709 A | 7/2011 |

OTHER PUBLICATIONS

International Search Report (PCT/ISA/210) mailed on Nov. 29, 2011, by the Japanese Patent Office as the International Searching Authority for International Application No. PCT/JP2011/073580.
Written Opinion (PCT/ISA/237) mailed on Nov. 29, 2011, by the Japanese Patent Office as the International Searching Authority for International Application No. PCT/JP2011/073580.

* cited by examiner

*Primary Examiner* — Don N Vo
(74) *Attorney, Agent, or Firm* — Buchanan Ingersoll & Rooney PC

(57) ABSTRACT

A protection control apparatus includes a control-signal output circuit configured to generate a sampling signal in synchronization with a 1PPS signal and output, as a control signal, data numbers cyclically counted up every time the sampling signal is generated and the sampling signal and a data output unit configured to convert a system electrical quantity into digital data based on the control signal and output the digital data. The control-signal output circuit includes a number-of-clocks calculating circuit configured to calculate a second number of clocks and a third number of clocks and a synchronization control unit configured to calculate a difference between a first number of clocks and a second number of clocks, control a cycle of the sampling signal based on the difference and the third number of clocks, and synchronize generation timing of the sampling signal with the 1PPS signal.

4 Claims, 8 Drawing Sheets

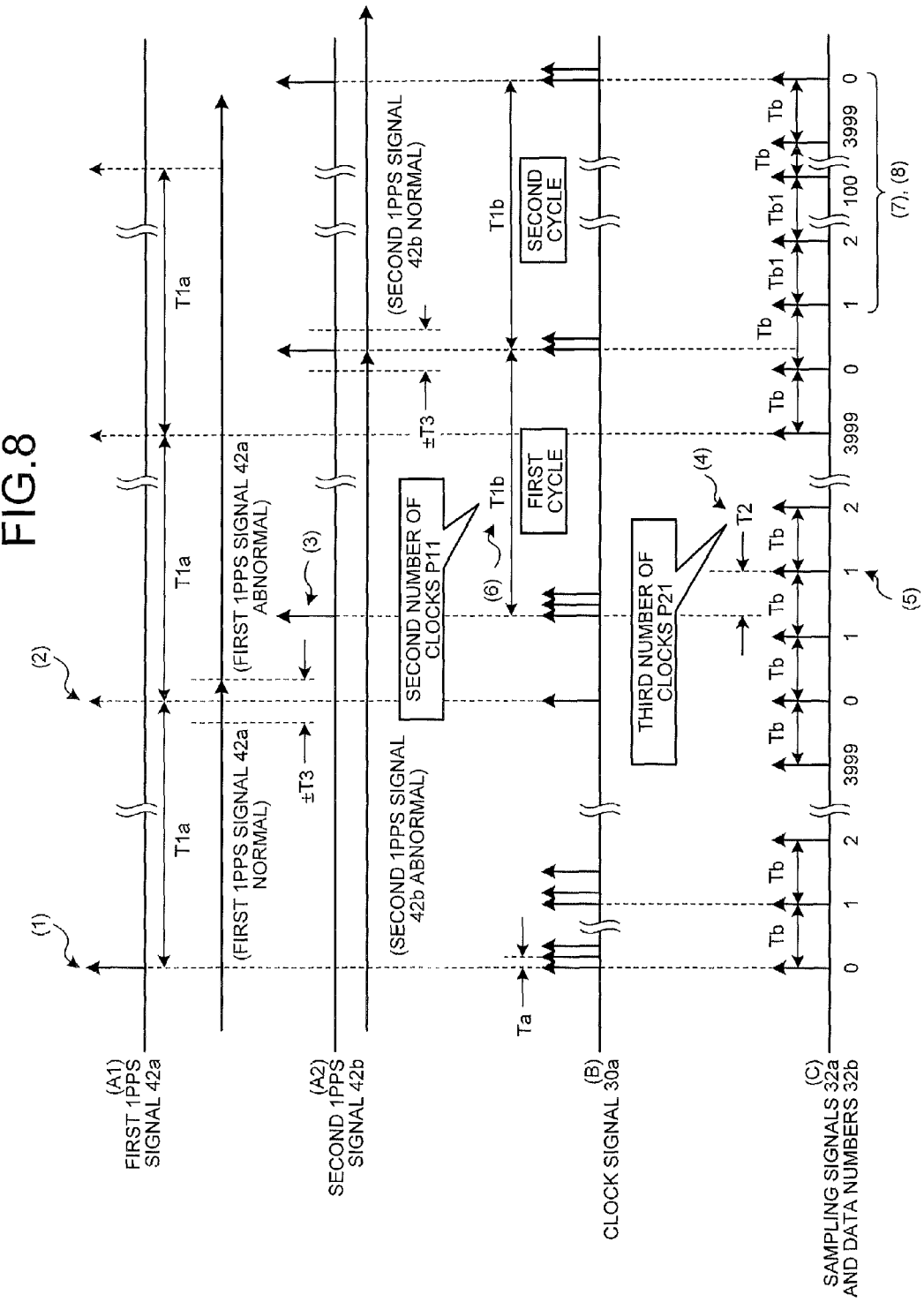

PROTECTION CONTROL APPARATUS

FIELD

The present invention relates to a protection control apparatus that protects a power system based on a system electrical quantity detected in the power system.

BACKGROUND

A general protection relay is set in a substation or the like, captures a system electrical quantity, AD analog/digital)-converts analog data concerning the system electrical quantity into digital data, performs a relay operation such as accident detection based on the AD-converted data, and outputs the data to an external contact. In this way, the general protection relay performs a series of processing within the same unit.

On the other hand, a process bus-adapted protection relay includes a merging unit (MU) set near a primary apparatus of a power system and configured to capture a system electrical quantity, a unit called IED (Intelligent Electric Device) set in a place remote from the MU (e.g., a protection control room of a substation) and configured to perform a relay operation, and a communication line (referred to as "process bus") such as an optical fiber configured to connect the MU and the IED. The process bus-adapted protection relay converts analog data into digital data in the MU. The relay operation is executed according to the digital data transmitted to the IED via the process bus.

To secure operation reliability, the conventional protection relay is configured to make the units redundant, when an abnormality occurs in any of the units, continue protection with the normal units, or divide the units into a main unit and an auxiliary unit and, when a failure occurs, switch the main unit to the auxiliary unit so as not to stop the protection. For example, the related art described in Patent Literature 1 proposes that, in electrical quantity input circuits (equivalent to the MU) in which system electrical quantities are input in two systems, one of the system electrical quantities is normally input to a protection relay (equivalent to the IED) and, when an abnormality detection circuit detects an abnormality of the system electrical quantity, the electrical quantity input circuit is switched to the other normal electrical quantity input circuit so as to input the system electrical quantity.

CITATION LIST

Patent Literature

Patent Literature 1: Japanese Patent Application Laid-Open No. H09-215171 (paragraph 0010, FIG. 1, etc.)

SUMMARY

Technical Problem

However, the related art represented by Patent Literature 1 has a problem explained below. In the case of a protection relay adapted to a process bus in which data AD-converted by a plurality of MUs is transmitted to one IED and protection control is performed using the data transmitted from the MUs, it is necessary to perform the AD conversion at the same timing in the MUs. Therefore, it is necessary to send the same sampling synchronization signals (hereinafter "synchronization signals") from the IED to the MUs. When the IED is one system, the synchronization signal is transmitted from the IED to the MUs through the process bus or through another line. However, when IEDs are formed in two systems, when an abnormality occurs in one of the IEDs, the IED is switched to the normal IED, whereby a synchronization signal transmitted from the abnormal IED is switched to a synchronization signal transmitted from the normal IED and protection can be continued. However, actually, when a transmission source of the synchronization signal is switched to the other IED because of the abnormality of one IED, the cycle of a sampling signal synchronizing with the synchronization signal before the switching and the cycle of a sapling signal synchronizing with the synchronization signal after the switching sometimes become discontinuous. In that case, digital data having different sampling cycles are generated in the MUs. Therefore, the IED that receives the digital data is likely to be incapable of using the digital data for a protection operation. In that case, in the IED, digital data for time necessary for the protection operation needs to be accumulated again. During the accumulation of the digital data, there is a problem in that the protection is stopped. Such a problem is unlikely when a signal transmitted from a GPS (Global Positioning System) is used instead of synchronization signals transmitted from the unsynchronized IEDs. However, when synchronization signals generated by independent clocks (internal oscillators) in the IEDs are used, usually, because clock cycles of the IEDs are not considered to be the same, when the IED is switched, it is naturally possible that the cycle of the synchronization signal before the switching and the cycle of the synchronization signal after the switching cannot be synchronized.

On the other hand, to realize time synchronization of the MU and the IED, a 1PPS (1 Pulse Per Second) signal is sometimes used as a synchronization signal transmitted from the IED to the MU. For example, in an MU of a protection relay in which one MU and one IED are connected, when the 1PPS signal is not transmitted from the IED, a sampling signal is generated by an internal clock in the MU and AD conversion is performed with this sampling signal. When the 1PPS signal is transmitted from the IED, a sampling signal synchronizing with the cycle of the 1PPS signal is generated by the internal clock of the MU and the AD conversion is performed with this sampling signal. With such a configuration, even when a plurality of MUs are connected to one IED, the MUs can execute the AD conversion at the same timing by the 1PPS signal transmitted from the IED. In the protection relay that uses the 1PPS signal, when the 1PPS is recovered after the protection is executed in a state in which the 1PPS signal is absent because of some cause, a sampling signal before the recovery of the 1PPS signal is generated by the internal clock in the MU without synchronizing with the cycle of the 1PPS signal. However, a sampling signal after the recovery of the 1PPS signal is generated by the internal clock in the MU while synchronizing with the cycle of the 1PPS signal. Therefore, the cycle of the sampling signal generated before the recovery of the 1PPS signal and the cycle of the sampling signal synchronizing with the 1PPS signal after the recovery of the 1PPS signal are likely to be discontinuous. In this case, because digital data having different sampling cycles are generated in the MU, the IED that receives the digital data cannot use it for the protection operation and accumulates digital data for the time necessary for the protection operation again. Therefore, there is a problem in that the protection is stopped during the accumulation of the digital data.

The present invention has been devised in view of the above and it is an object of the present invention to obtain a protection control apparatus that can continue protection even when sampling cycles are discontinuous.

Solution to Problem

In order to solve the aforementioned problems, a protection control apparatus that protects a power system based on a system electrical quantity detected in the power system according to one aspect of the present invention is configured to include: a control-signal output circuit configured to generate a sampling signal in synchronization with a synchronization signal received from an outside and output, as a control signal, numbers cyclically counted up every time the sampling signal is generated and the sampling signal; and a data output unit configured to convert the system electrical quantity into digital data based on the control signal output from the control-signal output circuit and output the digital data, wherein the control-signal output circuit further includes: a number-of-clocks calculating circuit configured to calculate, based on its own clocks of the number-of-clocks calculating circuit, a first number of clocks in time from a minimum to a maximum of the numbers, a second number of clocks in a cycle of the synchronization signal, and a third number of clocks in time from detection of the synchronization signal until the sampling signal is generated; and a synchronization control unit configured to calculate a difference between the first number of clocks and the second number of clocks, control a cycle of the sampling signal based on the difference and the third number of clocks, and synchronize generation timing of the sampling signal with the synchronization signal.

Advantageous Effects of Invention

According to the present invention, sampling cycles are controlled by clocks in an MU to synchronize sampling timing with a synchronization signal. Therefore, there is an effect that it is possible to continue protection because the sampling cycles can be controlled not to be discontinuous for a protection relay operation.

BRIEF DESCRIPTION OF DRAWINGS

FIG. 8 is a diagram for explaining the operation of the control-signal output circuit shown in FIG. 6.

DESCRIPTION OF EMBODIMENTS

Embodiments of a protection control apparatus according to the present invention are explained in detail below based on the drawings. The present invention is not limited by the embodiments.

First Embodiment

Figure 1:
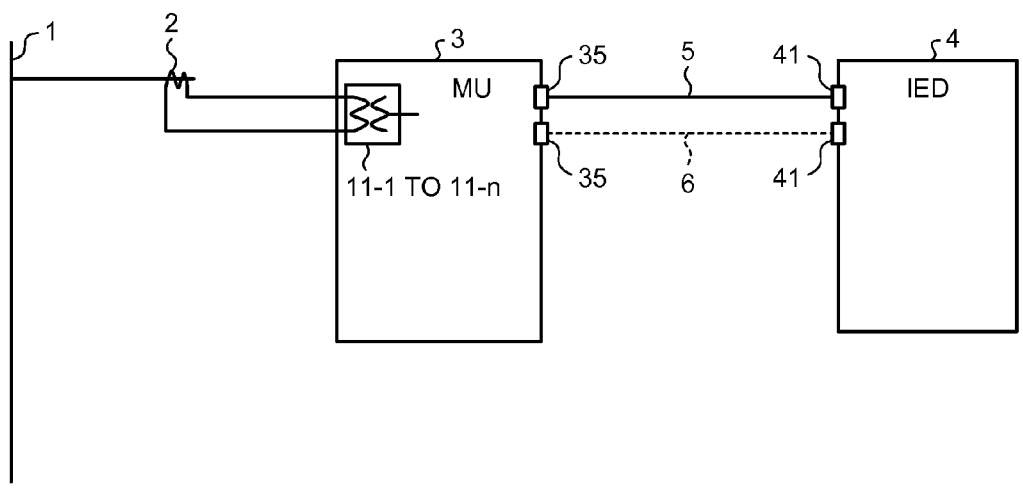
FIG. 1 is a configuration diagram of a protection relay according to a first embodiment of the present invention.

FIG. 1 is a configuration diagram of a protection relay according to a first embodiment of the present invention. In FIG. 1, a bus 1 (e.g., a three-phase bus for electric power set in a substation), which is a protection target of the protection relay, a transformer for meter (CT) 2 set in a feeder line (a power feed or distribution line) drawn out from the bus 1, an MU 3 configured to capture a system electrical quantity detected by the CT 2, and an IED 4 connected to the MU 3 via a process bus cable 5 and a sampling control signal cable 6 are shown.

The MU 3 AD-converts a system electrical quantity received from the CT 2 into digital data (data 15a) and transmits the converted data 15a to the process bus cable 5 as serial data. The IED 4 is set in a control room, a relay room, or the like. The IED 4 captures the serial data transmitted from the MU 3, decodes the data 15a from the serial data, and executes a protection operation using the data 15a. In the IED 4, a 1PPS signal 42, which is a sampling synchronization signal, is generated by a sampling synchronization signal generating circuit (not shown in the figure). The generated 1PPS signal 42 is standardized in a fixed format of the 1PPS signal in a standardization circuit (not shown in the figure), then converted into an optical signal, and transmitted to the MU 3. In the MU 3, timing of the AD conversion is controlled by the 1PPS signal 42.

Note that, in FIG. 1, in order to simplify the explanation, only one CT 2 is shown. However, feeder lines connected to the bus 1 are present for three phases. The feeder lines are sometimes several ten lines. Therefore, the CTs 2 are disposed for three phases and for the number of lines. Input converters 11 in the MUs 3 are disposed in the same manner. As an example, the MU 3 shown in FIG. 1 is configured to capture a CT 2 secondary current. However, the MU 3 is not limited to this and can be configured to capture a transformer for meter (PT) secondary voltage instead of the CT 2 secondary current.

Figure 2:
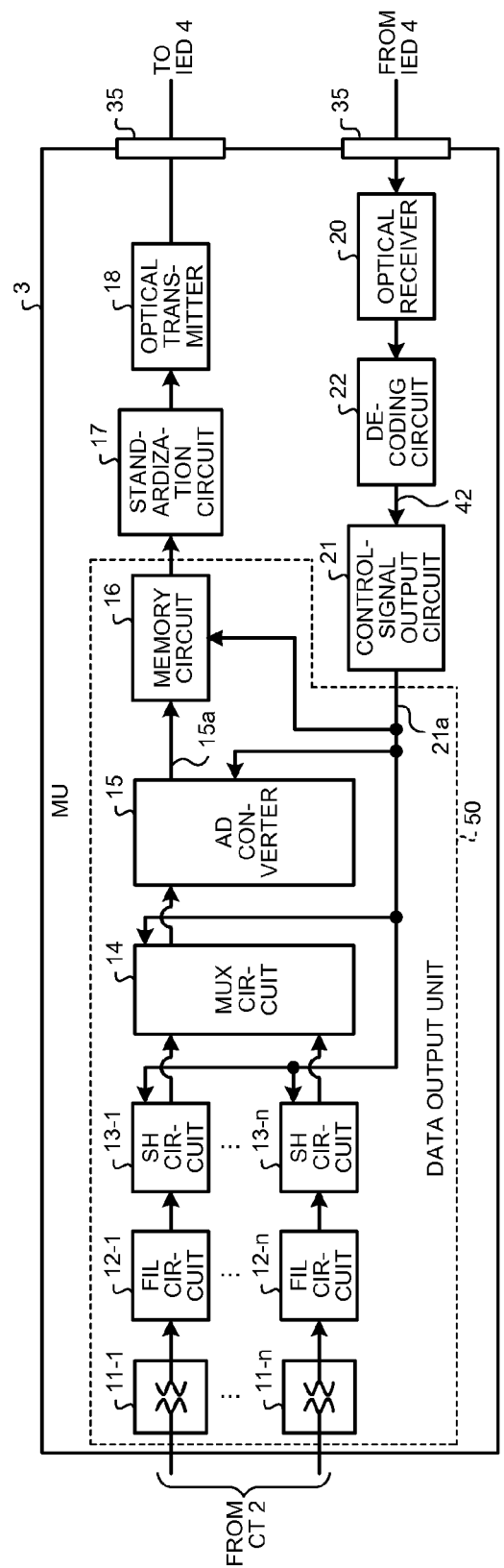
FIG. 2 is a block diagram of an MU shown in FIG. 1.

The configuration of the MU 3 is explained with reference to FIG. 2. FIG. 2 is a block diagram of the MU 3 shown in FIG. 1. The MU 3 shown in FIG. 2 includes, as main components, a data output unit 50, a standardization circuit 17, an optical transmitter 18, an optical receiver 20, a decoding circuit 22, and a control-signal output circuit 21. The data output unit 50 includes a plurality of input converters 11-1 to 11-$n$ (n=3 during CT three-phase input and n=4 during CT three-phase and CT residual input; the same applies below), a plurality of filter circuits (FIL) 12-1 to 12-$n$, a plurality of sample hold circuits (SHs) 13-1 to 13-$n$, a multiplexer (MUX) circuit 14, an AD converter 15, and a memory circuit 16.

The operation of the MU 3 is explained below. A CT current detected by the CT 2 is converted into a signal level in the MU 3 by the input converters 11-1 to 11-$n$. After high-frequency components are removed from the converted signals by the filter circuits 12-1 to 12-$n$, the converted signals are transmitted to the sample hold circuits 13-1 to 13-$n$. For AD conversion in the AD converter 15, the signals input to the sample hold circuits 13-1 to 13-$n$ are controlled (held for a short time) according to a control signal 21$a$ output from the control-signal output circuit 21 and are transmitted to the multiplexer circuit 14. The signals input to the multiplexer circuit 14 are switched in order according to the control signal 21$a$ output from the control-signal output circuit 21 and are transmitted to the AD converter 15. The signals input to the AD converter 15 are AD-converted according to sampling signals 32$a$ included in the control signal 21$a$ output from the control-signal output circuit 21 and are transmitted to the memory circuit 16 as the data 15$a$.

The data 15$a$ input to the memory circuit 16 are temporarily stored in the memory circuit 16. Data numbers 32$b$ included in the control signal 21$a$ output from the control-signal output circuit 21 are allocated to the data 15$a$ in order. The data 15$a$ are transmitted to the standardization circuit 17. Note that the data number 32$b$ is a number cyclically counted up at each sampling cycle Tb (hereinafter "cycle Tb") of the sampling signals 32a. The data numbers 32b are added to the data 15a after the AD conversion in the memory circuit 16. When a sampling frequency is 4 kHz, the data numbers 32b are numbers of 0 to 3999.

The signal input to the standardization signal 17 is standardized in a fixed format of a process bus, then converted into an optical signal by the optical transmitter 18, and transmitted to the IED 4 via a connector 35, the process bus cable 5, and a connector 41.

The optical signal from the IED 4 is input to the optical receiver 20 via the connector 35. The optical signal input to the optical receiver 20 is converted into an electric signal, then decoded as a 1PPS signal 42 by the decoding circuit 22, and input to the control-signal output circuit 21. The control-signal output circuit 21 generates, based on the 1PPS signal 42, the control signal 21a for controlling the sample hold circuits 13-1 to 13-n, the multiplexer circuit 14, the AD converter 15, and the memory circuit 16. For example, the AD converter 15 performs, at every cycle Tb of the sampling signals 32a included in the control signal 21a, AD conversion of all system electrical quantities received from the CT 2. The memory circuit 16 gives the data numbers 32b included in the control signal 21a to the data 15a received from the AD converter 15.

Figure 3:
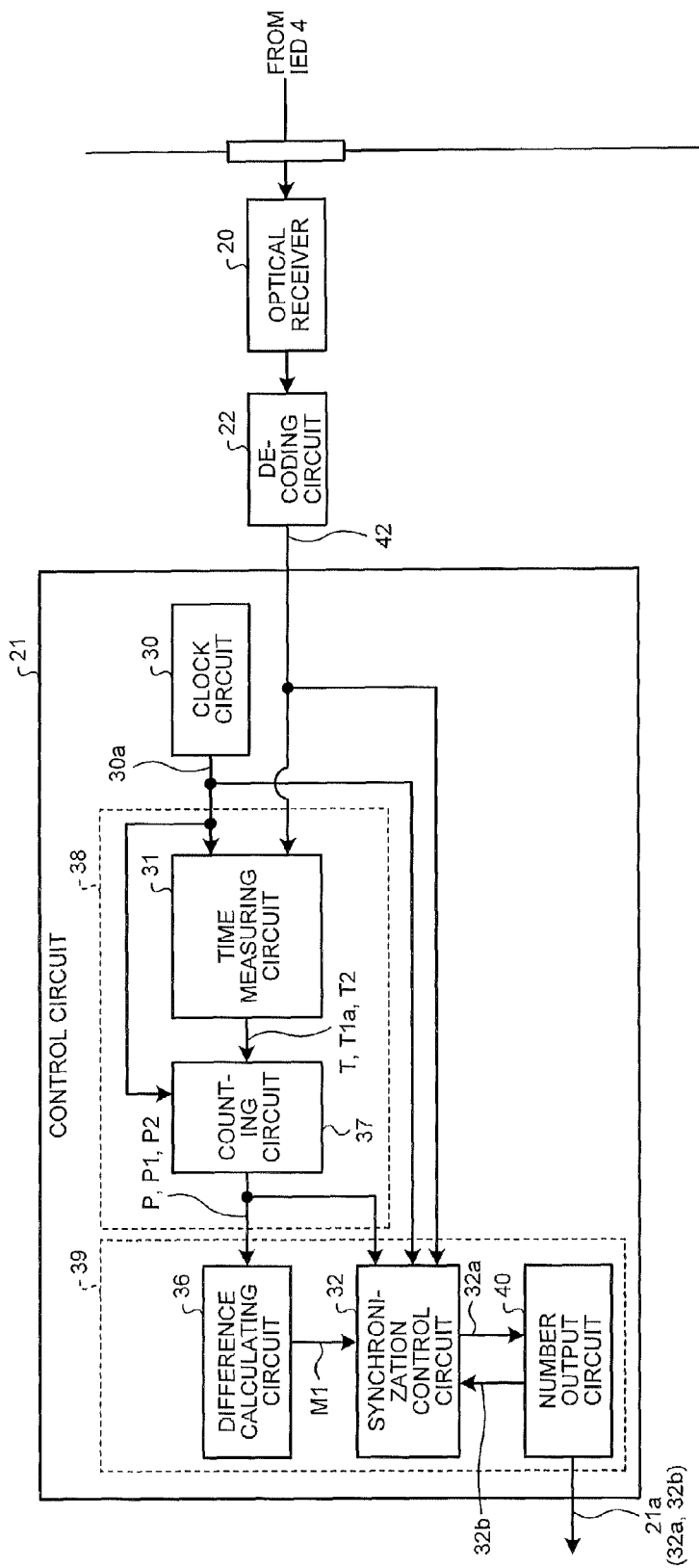
FIG. 3 is a block diagram of a control-signal output circuit shown in FIG. 2.
Figure 4:
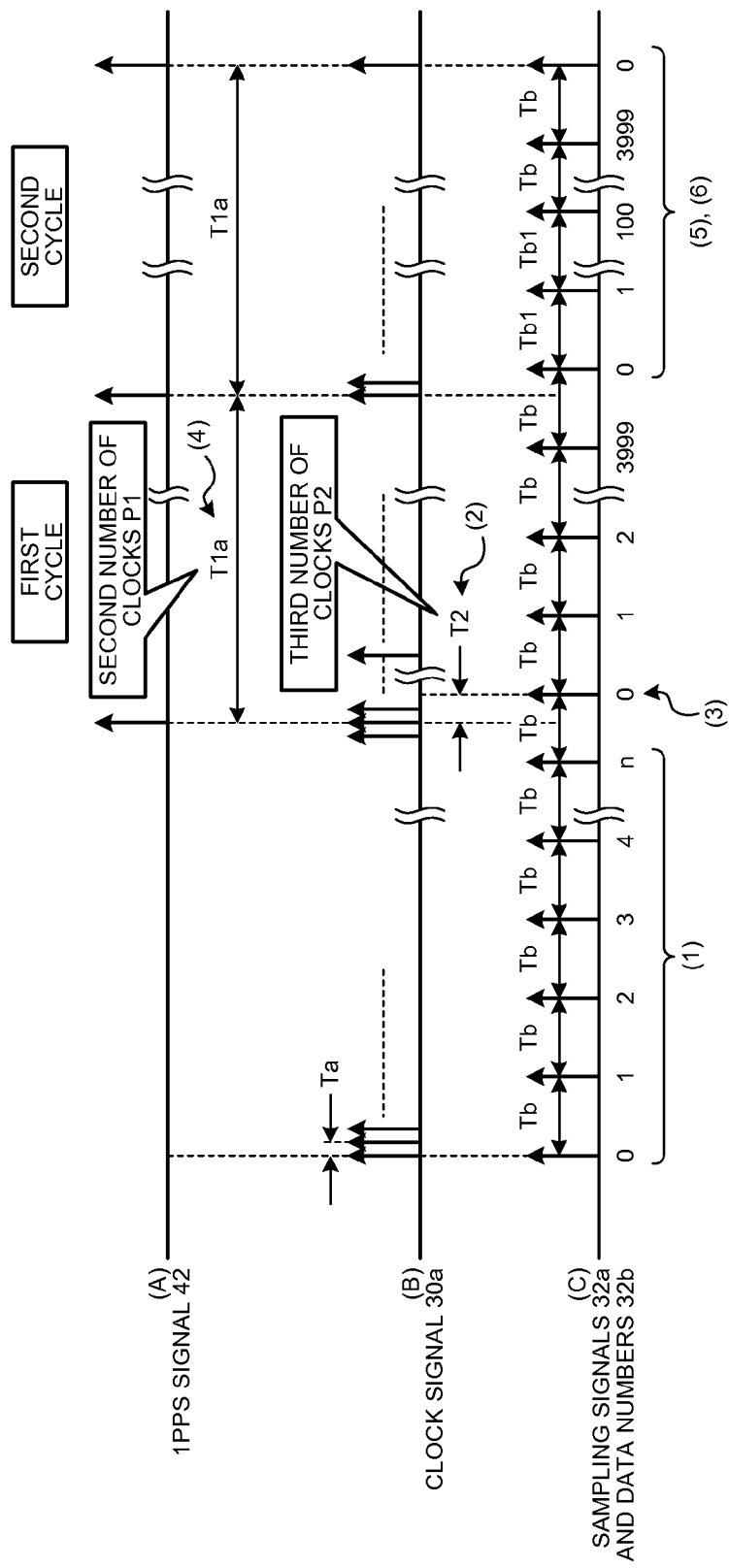
FIG. 4 is a diagram explaining the operation of the control-signal output circuit shown in FIG. 2.

The configuration and the operation of the control-signal output circuit 21 are explained with reference to FIGS. 3 and 4. FIG. 3 is a block diagram of the control-signal output circuit 21 shown in FIG. 2. FIG. 4 is a diagram for explaining the operation of the control-signal output circuit 21 shown in FIG. 2.

In FIG. 3, the control-signal output circuit 21 includes, as main components, a clock circuit 30, a number-of-clocks calculating unit 38, and a synchronization control unit 39. The number-of-clocks calculating unit 38 includes a time measuring circuit 31 and a counting circuit 37. The synchronization control unit 39 includes a difference calculating circuit 36, the synchronization control circuit 32, and a number output circuit 40.

A clock signal 30a is input to the time measuring circuit 31 from the clock circuit 30 and the 1PPS signal 42 is input to the time measuring circuit 31 from the decoding circuit 22. The time measuring circuit 31 measures, based on the clock signal 30a, time T (i.e., time from a number "0" to immediately before the next number "0"), a cycle T1a of the 1PPS signal 42, and time T2 from detection of the 1PPS signal 42 until the sampling signals 32a is generated. Note that the cycle T1a is a one-second interval based on the IED 4. The time T, the cycle T1a, and the time T2 are input to the counting circuit 37 from the time measuring circuit 31. The counting circuit 37 counts, based on the clock signal 30a, a first number of clocks P at the time T, a second number of clocks P1 at the cycle T1a, and a third number of clocks P2 at the time T2.

The difference calculating circuit 36 stores the first number of clocks P measured by the counting circuit 37 before the 1PPS signal 42 is detected. When receiving the second number of clocks P1 from the counting circuit 37, the difference calculating circuit 36 calculates a difference M1 between the first number of clocks P and the second number of clocks P1. The synchronization control circuit 32 stores the third number of clocks P2 counted by the counting circuit 37 when the 1PPS signal 42 is detected. The synchronization control circuit 32 controls, based on the difference M1 received from the difference calculating circuit 36 and the third number of clocks P2, the cycle Tb of the sampling signals 32a and synchronizes the timing of the sampling signals 32a with the 1PPS signal 42.

The number output circuit 40 counts up the data numbers 32b at timing when the sampling signals 32a are output from the synchronization control circuit 32 and outputs the control signal 21a including the sampling signals 32a and the data numbers 32b. The control signal 21a is used for control of the sample hold circuits 13-1 to 13-n, the multiplexer circuit 14, the AD converter 15, and the memory circuit 16.

In FIG. 4, an arrow on an abscissa (A) indicates reception timing of the 1PPS signal 42 in the MU 3. When the 1PPS signal 42 interrupted by some cause is recovered at a certain point, the MU 3 receives the 1PPS signal 42 of the cycle T1a.

An arrow on an abscissa (B) indicates generation timing of the clock signal 30a. The clock signal 30a is generated at, for example, 4 megahertz (a clock cycle Ta=0.25 µs).

An arrow on an abscissa (C) indicates the timing of the sampling signals 32a generated by the control-signal output circuit 21. The data numbers 32b are given to the sampling signals 32a. For example, the sampling signals 32a before the recovery of the 1PPS signal 42 are generated by the clock signal 30a without synchronizing with the 1PPS signal 42.

The accuracy of clocks used in the MU 3 and the IED 4 is usually about several ten PPM. When the accuracy is assumed as 10 PPM, an error is 10 microseconds in 1 second. That is, when it is assumed that errors are respectively present on a + side and a − side, an error in 1 second between the MU 3 and the IED 4 is 20 microseconds at the maximum. In the MU 3 and the IED 4, usually, clocks generated by dividing an oscillator output of several 10 megahertz are used. However, for simplification, it is assumed that a clock frequency is 4 megahertz. In the standard of a process bus, a sampling frequency for substation protection is specified as being 80 times as high as the frequency of a system. Therefore, when a rated frequency is 50 hertz, the sampling frequency is 4 kilohertz. Therefore, the cycle Tb of the sampling signals 32a is 250 microseconds. This is equivalent to 1000 clocks. A clock error of 20 microseconds is equivalent to 80 clocks (=4 MHz× 20 µs) when converted into the number of clocks. That is, there is a difference of 80 clocks at the maximum in 1 second between the cycle T1a of a one-second interval based on the IED 4 and the time T of one-second cycle based on the MU 3 (time in which the sampling signals 32a are generated by 4000 samples). Therefore, when the 1PPS signal 42 is recovered from an absent state, the cycle Tb of the sampling signals 32a is likely to be discontinuous. In this case, in the MU 3, digital data is generated at the discontinuous cycle Tb. Therefore, the IED 4 that receives the digital data is likely to be incapable of using the digital data for a protection operation.

The control-signal output circuit 21 according to the first embodiment is configured to control the cycle Tb of the sampling signals 32a and synchronize timing of the sampling signals 32a with the 1PPS signal 42 such that the protection operation can be continued when the 1PPS signal 42 is recovered. A specific operation example of the control-signal output circuit 21 is explained using signs (1) to (6) shown in FIG. 4.

(1) When the 1PPS signal 42 is absent, the synchronization control circuit 32 generates the sampling signals 32a of the cycle Tb (e.g., 1000 clocks) using the clock signal 30a. The number output circuit 40 outputs the data numbers 32b of 0 to 3999. The data numbers 32b are given to the data 15a by the memory circuit 16 shown in FIG. 2. The data 15a is transmitted to the IED 4.

(2) When the 1PPS signal 42 is detected, the time measuring circuit 31 measures, using the number of the clock signals 30a, the time (time T2) from a point when the 1PPS signal 42 is detected until a sampling signal 32a is generated after the 1PPS signal. The measured time T2 is transmitted to the counting circuit 37. The number of clocks equivalent to the time T2 is counted.

(3) When the time T2 is smaller than a half of the sampling cycle Tb (T2<(Tb/2)), that is, the time T2 is shorter than 125 microseconds (P2 is smaller than 500 clocks), the synchronization control circuit 32 gives, as the data number 32b, "0" to the sampling signal 32a after the detection of the 1PPS signal 42 in the first place and transmits the sampling signal 32a to the number output circuit 40. On the other hand, when the time T2 is equal to or larger than a half of the sampling cycle Tb (T2(Tb/2)), that is, the time T2 is equal to or longer than 125 microseconds (P2 is equal to or larger than 500 clocks), the synchronization control circuit 32 gives "1" to the sampling signal 32a as the data number 32b and transmits the sampling signal 32a to the number output circuit 40. Note that, in the example shown in FIG. 4, assuming that T2 is shorter than 125 microseconds, the data number 32b "0" has been given (4) Next, the time measuring circuit 31 measures the cycle T1a of the 1PPS signal 42. The counting circuit 37 counts the second number of clocks P1 at the cycle T1a. When the clock error explained above is referred to as an example, the second number of clocks P1 is, for example, 4000080. Therefore, the difference of 80 clocks is present between the first number of clocks P (=4000000) and the second number of clocks P1 (=4000080) at the time T. The difference calculating circuit 36 calculates the difference M1 between the first number of clocks P and the second number of clocks P1 and outputs the difference M1 to the synchronization control circuit 32.

(5) Concerning the sampling signals 32a equivalent to the number of clocks of the difference M1, the synchronization control circuit 32 corrects the cycle Tb of the sampling signals 32a by a short time (e.g., 1 clock) not affecting the protection operation in the IED 4. For example, when the number of clocks of the difference M1 is "80", the sampling signals 32a equivalent to the number of clocks are the sampling signals 32a having the data numbers 32b "0" to "79" in the second cycle of the 1PPS signal 42. The synchronization control circuit 32 corrects the cycle Tb of the sampling signals 32a in the data numbers 32b to, for example, 999 clocks (=1000 clocks-1 clock). The synchronization control circuit 32 sets the cycle Tb of the remaining sampling signals 32a, that is, the sampling signals 32a having the data numbers 32b "80" to "3999" to 1000 clocks. Note that, in the above explanation, as an example, 1 clock is subtracted from 1000 clocks to correct the cycle Tb. However, in some case, 1 clock is added to the 1000 clocks to correct the cycle Tb. That is, when a value of the difference M1 is positive, the synchronization control circuit 32 subtracts 1 clock from the number of clocks (1000 clocks) of the reference sampling cycle Tb to correct the cycle Tb of the sampling signals 32a. When the value of the difference M1 is negative, the synchronization control circuit 32 adds 1 clock to the number of clocks of the reference sampling cycle Tb to correct the cycle Tb of the sampling signals 32a.

As explained above, the synchronization control circuit 32 controls the cycle Tb of the sampling signals 32a (increases or reduces the cycle Tb) according to the value of the difference M1 to, for example, synchronize the generation timing of the sampling signal 32a having the data number 32b "0" with the timing of the third 1PPS signal 42 shown in FIG. 4.

(6) When the 1PPS signal 42 is detected first from the state without the 1PPS signal 42, the 1PPS signal 42 and the sampling signals 32a are asynchronous by the third number of clocks P2. Therefore, at the second cycle of the 1PPS signal 42, concerning the sampling signals 32a equivalent to a third number of clocks P21, the synchronization control circuit 32 corrects the cycle Tb of the sampling signals 32a by a short time (e.g., 1 clock) not affecting the protection operation in the IED 4. Note that a correction amount of clocks is not limited to 1 clock and can be 2 or more clocks in a range not affecting the protection operation.

When the time T2 is smaller than a half of the sampling cycle Tb (T2<(Tb/2)), that is, the third number of clocks P2 is smaller than 500 clocks (e.g., 400 clocks), the synchronization control circuit 32 corrects the cycle Tb of the sampling signals 32a having the data numbers 32b "0" to "399" at the second cycle of the 1PPS signal 42 to, for example, 999 clocks (=1000 clock-1 clock). The synchronization control circuit 32 sets the cycle Tb of the remaining sampling signals 32a, that is, the sampling signals 32a having the data numbers 32b "400" to "3999" to 1000 clocks.

When the time T2 is equal to or larger than a half of the sampling cycle Tb (T2(Tb/2)), that is, the third number of clocks P2 is equal to or larger than 500 clocks (e.g., 900 clocks), the synchronization control circuit 32 corrects the cycle Tb of the sampling signals 32a having the data numbers 32b "0" to "99" in the second cycle of the 1PPS signal 42 (equivalent to 100 (=1000–900) clocks in 0 to 99) to, for example, 1001 clocks (=1000 clocks+1 clock). The synchronization control circuit 32 sets the cycle Tb of the remaining sampling signals 32a, that is, the sampling signals 32a having the data numbers 32b "100" to "3999" to 1000 clocks.

As explained above, the synchronization control circuit 32 controls the cycle Tb of the sampling signal 32a equivalent to the third number of clocks P2 (increases or reduces the cycle Tb). Consequently, for example, a synchronization shift equivalent to the time T2 is eliminated at the timing of the third 1PPS signal 42, so that it is made possible to synchronize the generation timing of the sampling signal 32a having the data number 32b "0" with the timing of the 1PPS signal 42.

Note that Tb1 shown in FIG. 4 indicates a generation cycle of the sampling signals 32a corrected using the cycle T1a and the time T2. For example, the sampling signals 32a of "0" to "99" are generated at every 1001 clocks. The sampling signals 32a of "100" to "3999" are generated at a cycle of 1000 clocks.

As explained above, the protection control apparatus according to the first embodiment is the protection control apparatus that protects the power system based on a system electrical quantity detected in the power system. The protection control apparatus includes the control-signal output circuit 21 configured to generate the sampling signals 32a in synchronization with the synchronization signal (the 1PPS signal 42) from the outside and output the numbers 32b, which are cyclically counted up every time the sampling signals 32a are generated, and the sampling signals 32a as the control signal 21a and the data output unit 50 configured to convert a system electrical quantity into the digital data 15a based on the control signal 21a output from the control-signal output circuit 21 and output the digital data 15a. The control-signal output circuit 21 includes the number-of-clocks calculating circuit 38 configured to calculate, based on a clock of the number-of-clocks calculating circuit 38, the first number of clocks P in the time T from a minimum to a maximum of the numbers 32b, the second number of clocks P1 in the cycle T1a of the 1PPS signal 42, and the third number of clocks P2 in the time T2 from the detection of the 1PPS signal 42 until a sampling signal 32a is generated, and the synchronization control unit 39 configured to calculate the difference M1 between the first number of clocks P and the second number of clocks P1, control the cycle Tb of the sampling signals 32a based on the difference M1 and the third number of clocks P2, and synchronize generation timing of the sampling signals 32a with the 1PPS signal 42. Therefore, it is possible to continue the protection in the IED 4 by synchronizing the timing of the sampling signals 32a with the 1PPS signal 42 while slowing changing the cycle Tb of the sampling signal 32a rather than immediately synchronizing the generation timing of the sampling signal 32a with the timing when the 1PPS signal 42 is detected from the absent state of the 1PPS signal 42. With the protection relay according to the first embodiment, it is possible to output the sampling signal 32a that follows cycle fluctuation of the 1PPS signal 42 that changes with time or because of the influence of a temperature environment.

Second Embodiment

The protection relay in the first embodiment includes one MU 3 and one IED 4 and is configured to be capable of continuing the protection operation by slowly changing, when the 1PPS signal 42 is detected from the absent state of the 1PPS signal 42, the cycle Tb of the sampling signals 32a at a level not affecting the protection operation in the IED 4. In a protection relay in a second embodiment, two systems of the IEDs 4 are provided with respect to one MU 3. The protection relay is configured to be capable of continuing protection even when a sampling cycle of AD conversion is discontinuous by switching, when the 1PPS signal 42 output from one IED 4 is abnormal, the 1PPS signal 42 to the 1PPS signal 42 output from the other IED 4 and synchronizing the cycle Tb of the sampling signal 32a with the cycle of the 1PPS signal 42 output from the normal IED 4. In the following explanation, components same as the components in the first embodiment are denoted by the same reference numerals and signs and explanation of the components is omitted. Only differences are explained.

Figure 5:
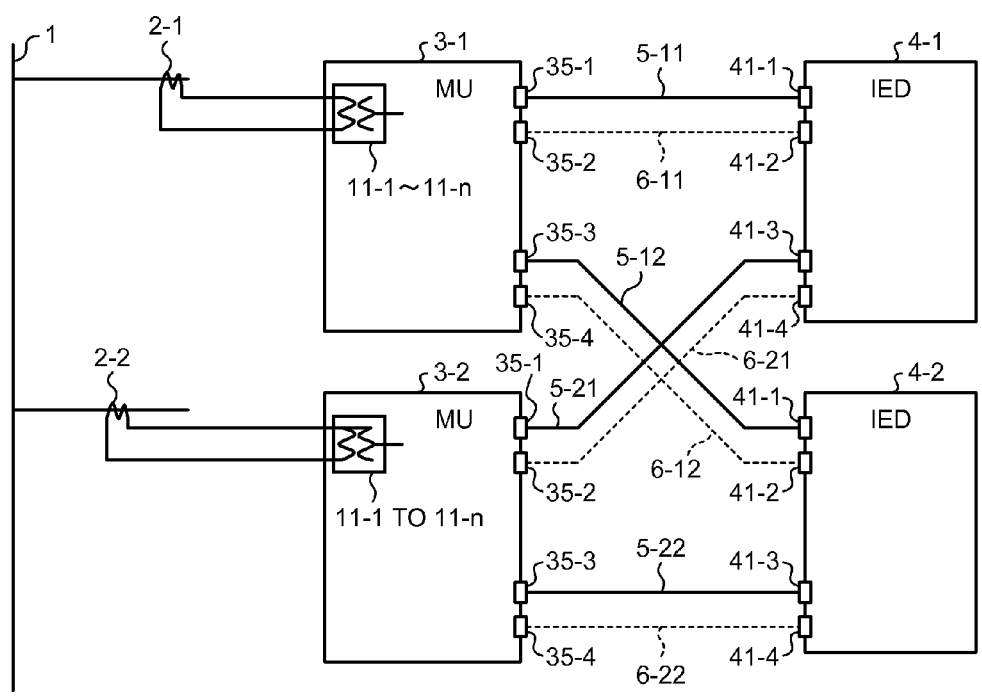
FIG. 5 is a configuration diagram of a protection relay according to a second embodiment of the present invention.

FIG. 5 is a configuration diagram of the protection relay according to the second embodiment of the present invention. In FIG. 5, the bus 1, a CT 2-1 set in a feeder line drawn out from the bus 1, a CT 2-2 set in the other feeder line, a first MU 3-1, a second MU 3-2, a first IED 4-1, and a second IED 4-2 are shown.

The first MU 3-1 AD-converts a system electrical quantity received from the Ct 2-1 into digital data (the data 15a) and transmits the converted data 15a to process bus cables 5-11 and 5-12 as serial data. The second MU 3-2 AD-converts a system electrical quantity received from the CT 2-2 into digital data and transmits the converted digital data to process bus cables 5-21 and 5-22 as serial data.

The first IED 4-1 captures the serial data from the MUs (3-1 and 3-2) via the process bus cables 5-11 and 5-21, decodes the digital data from the serial data, and executes a protection operation using the digital data. In the first IED 4-1, a first 1PPS signal 42a, which is a sampling synchronization signal, is generated by a sampling synchronization signal generating circuit (not shown in the figure). The first 1PPS signal 42a is converted into an optical signal after being standardized in a fixed format by a standardization circuit (not shown in the figure), and is transmitted to the MUs (3-1 and 3-2) via sampling control signal cables 6-11 and 6-21.

The second IED 4-2 captures serial data from the MUs (3-1 and 3-2) via the process bus cables 5-12 and 5-22, decodes the digital data from the serial data, and executes a protection operation using the digital data. In the second IED 4-2, a second 1PPS signal 42b, which is a sampling synchronization signal, is generated by a sampling synchronization signal generating circuit (not shown in the figure). The second 1PPS signal 42b is converted into an optical signal after being standardized in a fixed format by a standardization circuit (not shown in the figure) and is transmitted to the MUs (3-1 and 3-2) via sampling control signal cables 6-12 and 6-22.

When the first IED 4-1 is normal, the MUs (3-1 and 3-2) control timing of the AD conversion with the first 1PPS signal 42a received from the first IED 4-1. For example, when the first 1PPS signal 42a is not transmitted within a predetermined period because of a failure of the first IED 4-1, disconnection of the sampling control signal cable 6-11, or the like, the MUs (3-1 and 3-2) detect an abnormality of the first 1PPS signal 42a, switch the first 1PPS signal 42a to the second 1PPS signal 42b, and control the timing of the AD conversion.

Figure 6:
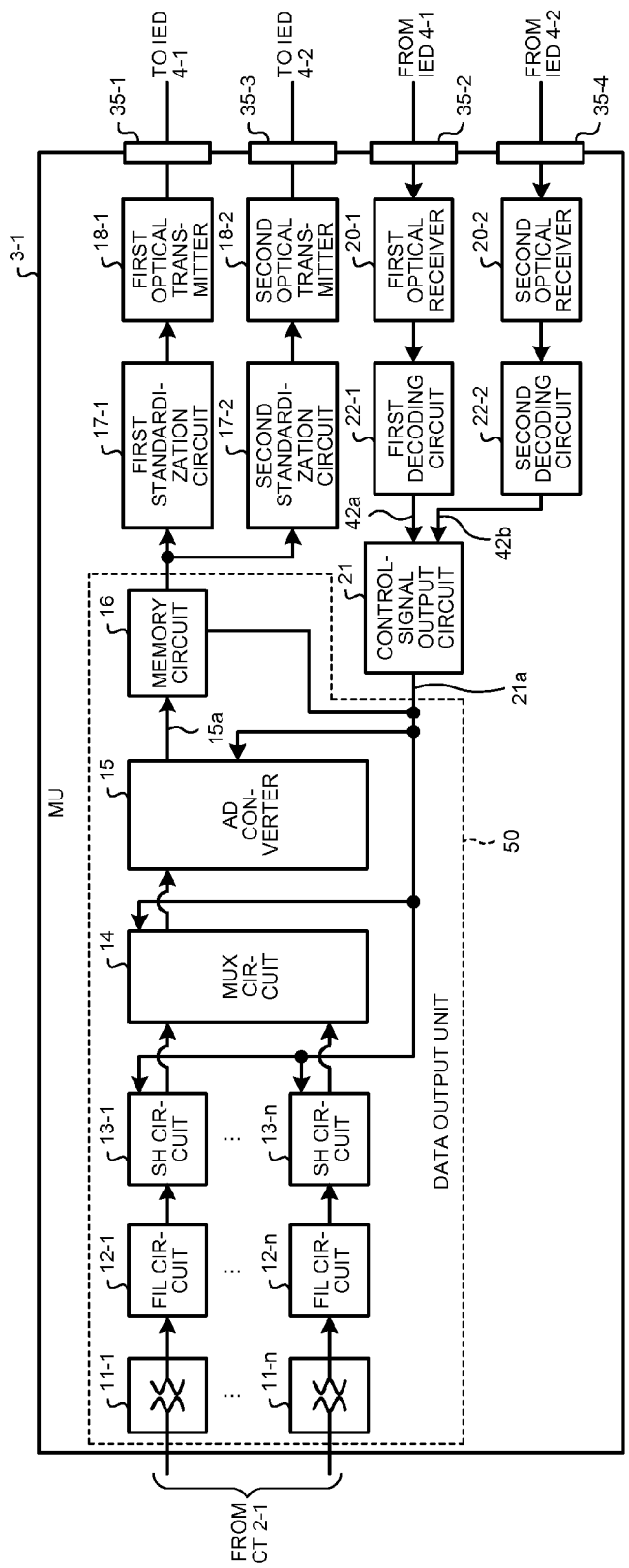
FIG. 6 is a block diagram of an MU shown in FIG. 5.

The configuration of the MUs (3-1 and 3-2) is explained with reference to FIG. 6. FIG. 6 is a block diagram of the first MU 3-1 shown in FIG. 5. Because the configuration of the second MU 3-2 is the same as the configuration of the first MU 3-1, explanation of the configuration is omitted below.

The first MU 3-1 shown in FIG. 6 includes, as main components, the data output unit 50, a first standardization circuit 17-1, a second standardization circuit 17-2, a first optical transmitter 18-1, a second optical transmitter 18-2, a first optical receiver 20-1, a second optical receiver 20-2, a first decoding circuit 22-1, a second decoding circuit 22-2, and a control-signal output circuit 21.

The operation of the first MU 3-1 is explained below. A CT current detected by the CT 2-1 is converted into a signal level in the MU 3-1 by the input converters 11-1 to 11-n. After high-frequency components are removed from the converted signals by the filter circuits 12-1 to 12-n, the converted signals are transmitted to the sample hold circuits 13-1 to 13-n. The signals input to the sample hold circuits 13-1 to 13-n are controlled according to the control signal 21a output from the control-signal output circuit 21 and are transmitted to the multiplexer circuit 14. The signals input to the multiplexer circuit 14 are switched in order according to the control signal 21a and transmitted to the AD converter 15. The signals input to the AD converter 15 are AD-converted according to the control signal 21a and transmitted to the memory circuit 16 as the data 15a.

The data 15a input to the memory circuit 16 are temporarily stored in the memory circuit 16. The data numbers 32b included in the control signal 21a are allocated to the data 15a in order. The data 15a are transmitted to the standardization circuits (17-1 and 17-2). The signals input to the standardization signals (17-1 and 17-2) are standardized in a fixed format of a process bus, then transmitted to the optical transmitters (18-1 and 18-2), and converted into optical signals. The optical signal output from the first optical transmitter 18-1 is transmitted to the first IED 4-1 via a connector 35-1, the process bus cable 5-11, and a connector 41-1. The optical signal output from the second optical transmitter 18-2 is transmitted to the second IED 4-2 via a connector 35-3, the process bus cable 5-12, and the connector 41-1.

The optical signal output from the first IED 4-1 is input to the first optical receiver 20-1 via a connector 35-2. The optical signal input to the first optical receiver 20-1 is converted into an electric signal, then decoded as the first 1PPS signal 42a by the first decoding circuit 22-1, and input to the control-signal output circuit 21. The optical signal output from the second IED 4-2 is input to the second optical receiver 20-2 via a connector 35-4. The optical signal input to the second optical receiver 20-2 is converted into an electric signal, then decoded as the 1PPS signal 42b by the second decoding circuit 22-2, and input to the control-signal output circuit 21.

When the first IED 4-1 is normal, the control-signal output circuit 21 generates, based on the 1PPS signal 42a, the control signal 21a for controlling the sample hold circuits 13-1 to 13-n, the multiplexer circuit 14, the AD converter 15, and the memory circuit 16. For example, the AD converter 15 performs, at every cycle Tb of the sampling signals 32a included in the control signal 21a, AD conversion of a system electrical quantity. The memory circuit 16 gives the data numbers 32b included in the control signal 21a to the data 15a received from the AD converter 15.

When an abnormality of the first 1PPS signal 42a is detected, the control-signal output circuit 21 switches the first 1PPS signal 42a to the second 1PPS signal 42b and performs synchronization control of the sampling cycle based on the second 1PPS signal 42b.

Figure 7:
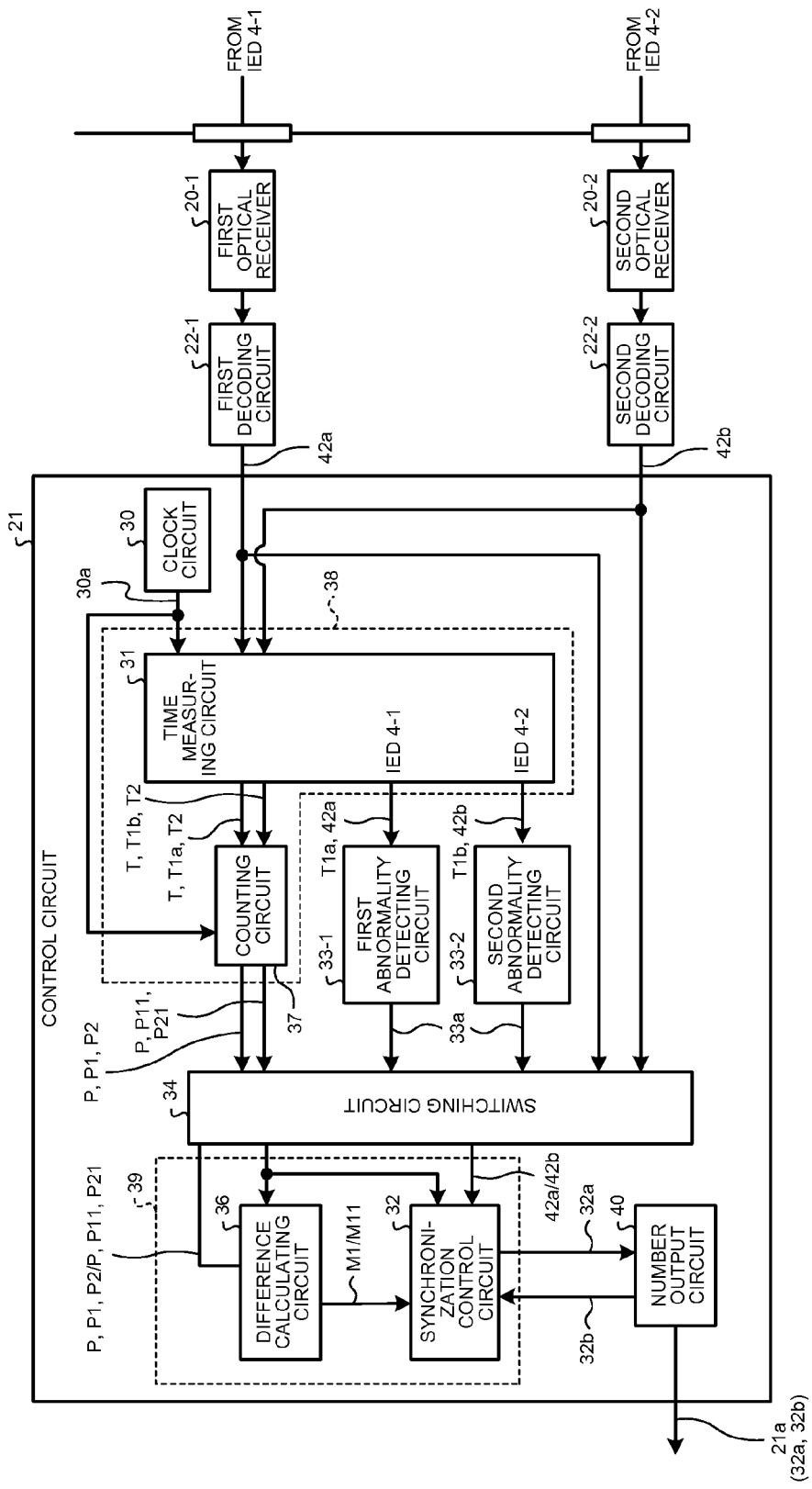
FIG. 7 is a block diagram of a control-signal output circuit shown in FIG. 6.

The configuration and the operation of the control-signal output circuit 21 according to the second embodiment are explained with reference to FIGS. 7 and 8. FIG. 7 is a block diagram of the control-signal output circuit 21 shown in FIG. 6. FIG. 8 is a diagram explaining the operation of the control-signal output circuit 21 shown in FIG. 6.

In FIG. 7, the control-signal output circuit 21 includes, as main components, the clock circuit 30, the number-of-clocks calculating unit 38, a first abnormality detecting circuit 33-1, a second abnormality detecting circuit 33-2, a switching circuit 34, and the synchronization control unit 39. The number-of-clocks calculating unit 38 includes the time measuring circuit 31 and the counting circuit 37. The synchronization control unit 39 includes the difference calculating circuit 36, the synchronization control circuit 32, and the number output circuit 40.

The clock signal 30a is input to the time measuring circuit 31 from the clock circuit 30, the first 1PPS signal 42a is input to the time measuring circuit 31 from the first decoding circuit 22-1, and the second 1PPS signal 42b is input to the time measuring circuit 31 from the second decoding circuit 22-2. The time measuring circuit 31 measures the time T, the cycle T1a of the first 1PPS signal 42a, a cycle T1b of the second 1PPS signal 42b, and the time T2. The time T2 represents either the time from detection of the first 1PPS signal 42a until the sampling signal 32a is generated or the time from detection of the second 1PPS signal 42b until the sampling signal 32a is generated. The cycle T1b is a one-second interval based on the IED 4-1 or the IED 4-2.

The time T, the cycle T1a, the cycle T1b, and the time T2 are input to the counting circuit 37 from the time measuring circuit 31. The counting circuit 37 counts, based on the clock signal 30a, the first number of clocks P in the time T, the second number of clocks P1 at the cycle T1a, a second number of clocks P11 at the cycle T1b, and the third number of clocks P2 at the time T2. The third number of clocks P2 is based on the time T2 from the detection of the first 1PPS signal 42a until the sampling signal 32a is generated. The third number of clocks P21 is based on the time T2 from the detection of the second 1PPS signal 42b until the sampling signal 32a is generated.

When the first 1PPS signal 42a is not detected in a period of time in a range (T1a±T3) predicted from the cycle T1a of the first 1PPS signal 42a in the past output from the time measuring circuit 31, the first abnormality detecting circuit 33-1 detects an abnormality of the first 1PPS signal 42a and outputs an abnormality detection signal 33a.

When the second 1PPS signal 42b is not detected in a period of time in a range (T1b±T3) predicted from the cycle T1b of the second 1PPS signal 42b output from the time measuring circuit 31, the second abnormality detecting circuit 33-2 detects an abnormality of the second 1PPS signal 42b and outputs the abnormality detection signal 33a.

When receiving the abnormality detection signal 33a from the first abnormality detecting circuit 33-1, the switching circuit 34 selects the second 1PPS signal 42b, selects the first number of clocks P and the second number of clocks P1 received from the counting circuit 37, and outputs the second 1PPS signal 42b, the first number of clocks P, and the second number of clocks P1. When receiving the abnormality detection signal 33a from the second abnormality detecting circuit 33-2, the switching circuit 34 selects the first 1PPS signal 42a, selects the first number of clocks P and the second number of clocks P11 received from the counting circuit 37, and outputs the first 1PPS signal 42a, the first number of clocks P, and the second number of clocks P11.

The difference calculating circuit 36 stores the first number of clocks P measured by the counting circuit 37 before the 1PPS signal 42 is detected. When receiving the second number of clocks P1 (P11) and the third number of clocks P2 (P21) from the switching circuit 34, the difference calculating circuit 36 calculates the difference M1 between the first number of clocks P and the second number of clocks P1 or a difference M11 between the first number of clocks P and the second number of clocks P11.

The synchronization control circuit 32 stores the third number of clocks P2 counted by the counting circuit 37 when the first 1PPS signal 42a is detected. The synchronization control circuit 32 controls, based on the difference M1 received from the difference calculating circuit 36 and the third number of clocks P2, the cycle Tb of the sampling signals 32a and synchronizes the timing of the sampling signals 32a with the first 1PPS signal 42a. The synchronization control circuit 32 stores the third number of clocks P21 counted by the counting circuit 37 when the second 1PPS signal 42b is detected. The synchronization control circuit 32 controls, based on the difference M11 received from the difference calculating circuit 36 and the third number of clocks P21, the cycle Tb of the sampling signals 32a and synchronizes the timing of the sampling signals 32a with the second 1PPS signal 42b.

In FIG. 8, a solid line arrow on an abscissa (A1) indicates reception timing of the actually-input first 1PPS signal 42a. A broken line arrow shown in (A1) indicates the first 1PPS signal 42a that is not actually input but should be input at the cycle T1a predicted from the first 1PPS signal 42a in the past. That is, the dotted line arrow indicates that the first 1PPS signal 42a is interrupted because of some cause. An arrow on an abscissa (A2) indicates the second 1PPS signal 42b input at a fixed cycle after the first 1PPS signal 42a is interrupted. The operation of the control-signal output circuit 21 is specifically explained using signs (1) to (8) shown in FIG. 8.

(1) When the first 1PPS signal 42a is continuously input, the synchronization control circuit 32 generates, using the clock signal 30a, the sampling signals 32a synchronizing with the cycle of the first 1PPS signal 42a. In FIG. 8, a state in which generation timing of the sampling signal 32a having the data number 32b "0" synchronizes with timing of the first 1PPS signal 42a is shown.

(2) When the first 1PPS signal 42a is not detected until, for example, the time obtained by adding T3 to T1a (the period of time in a predicted range) because an abnormality has occurred in the first 1PPS signal 42a at a certain point, the first abnormality detecting circuit 33-1 outputs the abnormality detection signal 33a. For example, although the first abnormality detecting circuit 33-1 determines that the first 1PPS signal 42a indicated by the solid line arrow is normal, because the first 1PPS signal 42a has not been received in the period of time, the first abnormality detecting circuit 33-1 determines that the first 1PPS signal 42a indicated by the dotted line arrow is abnormal.

(3) When receiving the abnormality detection signal 33a from the first abnormality detecting circuit 33-1, the switching circuit 34 selects the second 1PPS signal 42b and outputs the second 1PPS signal 42b to the synchronization control circuit 32. With the second 1PPS signal 42b received from the switching circuit 34, the synchronization control circuit 32 recognizes that the first 1PPS signal 42a is switched to the second 1PPS signal 42b. When both of the first 1PPS signal 42a and the second 1PPS signal 42b are controlled by the GPS, the first 1PPS signal 42a and the second 1PPS signal 42b can be synchronized because the cycles of the signals are the same. However, when the signals are generated by internal clocks of the respective IEDs (4-1 and 4-2) instead of the GPS, the cycle T1a and the cycle T1b are not the same because of an individual difference between oscillator devices of the respective IEDs. Therefore, as shown in FIG. 8, the cycle T1a indicated by the dotted line arrow and the cycle T1b indicated by the solid line arrow cannot be synchronized. For example, the timing of the second 1PPS signal 42b in the first place and the timing of the sampling signal 32a having the data number 32b "1" are in a shifted state.

(4) When the second 1PPS signal 42b is detected, the time measuring circuit 31 measures a period (the time T2) from a point when the second 1PPS signal 42b is detected until the sampling signal 32a following the second 1PPS signal 42b is generated. The measured time T2 is transmitted to the counting circuit 37, so that the number of clocks equivalent to the time T2 is counted.

(5) When the time T2 is smaller than a half of the sampling cycle Tb (T2<(Tb/2)), that is, the time T2 is shorter than 125 microseconds (P21 is smaller than 500 clocks), the synchronization control circuit 32 gives, as the data number 32b, "0" to the sampling signal 32a generated after the second 1PPS signal 42b in the first place is detected and transmits the sampling signal 32a to the number output circuit 40. On the other hand, when the time T2 is equal to or larger than a half of the sampling cycle Tb (T2(Tb/2)), that is, the time T2 is equal to or longer than 125 microseconds (P21 is equal to or larger than 500 clocks), the synchronization control circuit 32 gives "1" to the sampling signal 32a as the data number 32b and transmits the sampling signal 32a to the number output circuit 40. In an example shown in FIG. 8, assuming that T2 is equal to or longer than 125 microseconds, the data number 32b "1" is added.

(6) Subsequently, the time measuring circuit 31 measures the cycle T1b of the second 1PPS signal 42b. The counting circuit 37 counts the second number of clocks P11 at the cycle T1b. Before the cycle T1b is measured, the sampling signals 32a of 4 kilohertz based on a clock reference of the first IED 4-1 are generated. However, after switching to the second 1PPS signal 42b, the sampling signals 32a of 4 kilohertz based on a clock reference of the second IED 4-2 are generated. As explained in the first embodiment, the accuracy of clocks used in the MU 3 and the IEDs (4-1 and 4-2) is usually about several ten PPM. When the accuracy is assumed to be 10 PPM, an error in one second is 20 microseconds at the maximum. When the clock frequency is assumed to be 4 megahertz, the sampling cycle Tb is equivalent to 1000 clocks. Therefore, the clock error of 20 microseconds is equivalent to 80 clocks. That is, there is a difference of 80 clocks at the maximum in one second between the cycle T1b at a one-second interval based on the second IED 4-2 and the time T at a one-second interval based on the MU 3. Therefore, when the clock difference explained above is referred to as an example, the second number of clocks P11 is, for example, 4000080. Therefore, the difference of 80 clocks is present between the first number of clocks P (=4000000) and the second number of clocks P11 (=4000080) at the time T. The difference calculating circuit 36 calculates the difference M11 between the first number of clocks P and the second number of clocks P11 and outputs the difference M11 to the synchronization control circuit 32.

(7) Concerning the sampling signals 32a equivalent to the number of clocks of the difference M11, the synchronization control circuit 32 corrects the cycle Tb of the sampling signals 32a as in the first embodiment. In this way, by controlling the cycle Tb of the sampling signal 32a (increases or reduces the cycle Tb) according to the value of the difference M11, the synchronization control circuit 32, for example, synchronize the generation timing of the sampling signal 32a having the data number 32b "0" with the timing of the third second 1PPS signal 42b shown in FIG. 8.

(8) Note that, when the first 1PPS signal 42a is switched to the second 1PPS signal 42b, the second 1PPS signal 42b and the sampling signals 32a are asynchronous by the third number of clocks P21. Therefore, at the second cycle of the second 1PPS signal 42b, concerning the sampling signals 32a equivalent to a third number of clocks P21, the synchronization control circuit 32 corrects the cycle Tb of the sampling signals 32a by a short time (e.g., 1 clock) to such an extent as not affecting the protection operation in the IED 4. Note that a correction amount of clocks is not limited to 1 clock and can be 2 or more clocks in a range not affecting the protection operation.

When the time T2 is smaller than a half of the sampling cycle Tb (T2<(Tb/2)), that is, the third number of clocks P21 is smaller than 500 clocks (e.g., 400 clocks), the synchronization control circuit 32 corrects the cycle Tb of the sampling signals 32a having the data numbers 32b "0" to "399" at the second cycle of the second 1PPS signal 42b to, for example, 999 clocks (=1000 clock−1 clock). The synchronization control circuit 32 sets the cycle Tb of the remaining sampling signals 32a, that is, the sampling signals 32a having the data numbers 32b "400" to "3999" to 1000 clocks.

When the time T2 is equal to or larger than a half of the sampling cycle Tb (T2(Tb/2)), that is, the third number of clocks P21 is equal to or larger than 500 clocks (e.g., 900 clocks), the synchronization control circuit 32 corrects the cycle Tb of the sampling signals 32a having the data numbers 32b "1" to "99" in the second cycle of the second 1PPS signal 42b to, for example, 1001 clocks (=1000 clocks+1 clock). The synchronization control circuit 32 sets the cycle Tb of the remaining sampling signals 32a, that is, the sampling signals 32a having the data numbers 32b "100" to "3999" to 1000 clocks.

As explained above, the synchronization control circuit 32 controls the cycle Tb of the sampling signal 32a equivalent to the third number of clocks P21 (increases or reduces the cycle Tb). Consequently, for example, a synchronization shift equivalent to the time T2 is eliminated at the timing of the third second 1PPS signal 42b. It is possible to synchronize generation timing of the sampling signal 32a having the data number 32b "0" with the timing of the second 1PPS signal 42b.

Note that Tb1 shown in FIG. 8 indicates a generation cycle of the sampling signals 32a corrected using the cycle T1b and the time T2. For example, the sampling signals 32a of "1" to "99" are generated at every 1001 clocks. The sampling signals 32a of "100" to "3999" are generated at a cycle of every 1000 clocks.

As explained above, the number-of-clocks calculating circuit 38 according to the second embodiment calculates, respectively as the second numbers of clocks P1 and P11, the number of clocks in the cycle T1a of a synchronization signal (the first 1PPS signal 42a) received from a first external device (the first IED 4-1) and the number of clocks in the cycle T1*b* of a synchronization signal (the second 1PPS signal 42*b*) received from a second external device (the second IED 4-2) and calculates, respectively as the third numbers of clocks P2 and P21, the number of clocks in the time T2 from detection of the first 1PPS signal 42*a* until the sampling signal 32*a* is generated and the number of clocks in the time T2 from detection of the second 1PPS signal 42*b* until the sampling signal 32*a* is generated. When an abnormality of the first 1PPS signal 42*a* is detected, the synchronization control unit 39 calculates the difference M11 between the first number of clocks P and the second number of clocks P11 related to the second 1PPS signal 42*b*. The synchronization control unit 39 controls the cycle Tb of the sampling signal 32*a* based on the difference M11 and the third number of clocks P21 related to the second 1PPS signal 42*b* to synchronize generation timing of the sampling signal 32*a* with the second 1PPS signal 42*b*. Therefore, it is possible to continue the protection in the IED 4 by synchronizing the timing of the sampling signals 32*a* with the second 1PPS signal 42*b* while slowly changing the cycle Tb of the sampling signal 32*a* rather than immediately synchronizing the generation timing of the sampling signals 32*a* with timing when the first 1PPS signal 42*a* is switched to the second 1PPS signal 42*b*. As in the protection relay according to the first embodiment, it is possible to output the sampling signal 32*a* that follows cycle fluctuation of the 1PPS signals (42*a* and 42*b*) that change with time or because of the influence of a temperature environment. With the protection control apparatus according to the second embodiment, it is possible to obtain the effects explained above even when cycles of signals are not the same because of an individual difference between the oscillator devices of the IEDs (4-1 and 4-2).

The synchronization control unit 39 according to the first and second embodiments controls the cycle Tb of the sampling signals 32*a* in a clock unit (e.g., 1 clock) of its own synchronization control unit 39. Therefore, it is possible to synchronize the timing of the sampling signals 32*a* with the 1PPS signal 42 without affecting the protection operation in the IED 4.

The protection control apparatuses according to the first and second embodiments control the cycle Tb of the sampling signals 32*a* using, as the synchronization signals, the 1PPS signals (42, 42*a*, and 42*b*) received from the GPS (Global Positioning System). Therefore, it is possible to subject all substation devices to time synchronization including sampling by the GPS. The 1PPS signals (42, 42*a*, and 42*b*) can be used for time synchronization of a time log.

In the above explanation, as a usage of the present invention, the example is explained in which the 1PPS signal 42 is used as the sampling synchronization signal. However, the same effects can be obtained when signals of the IEEE 1588 standard and the IRIG-B standard are used as the sampling synchronization signal.

The protection control apparatuses according to the first and second embodiment indicate example of contents of the present invention. It goes without saying that the protection control apparatuses can be combined with still other publicly-known technologies or configured to be changed to, for example, omit a part of the protection control apparatuses without departing from the spirit of the present invention.

INDUSTRIAL APPLICABILITY

As explained above, the present invention is mainly applicable to a merging unit of a protection control apparatus and,
in particular, useful as an invention that can continue protection even when sampling cycles are discontinuous.

REFERENCE SIGNS LIST

1 Bus
2, 2-1, 2-2 CTs
3 MU
3-1 First MU
3-2 Second MU
4 IED
4-1 First IED (first external device)
4-2 Second IED (second external device)
5, 5-11, 5-12, 5-21, 5-22 Process bus cables
6, 6-11, 6-12, 6-21, 6-22 Sampling control signal cables
11, 11-1 to 11-*n* Input converters
12-1 to 12-*n* Filter circuits
13-1 to 13-*n* Sample hold circuits
14 Multiplexer circuit
15 AD converter
15*a* Data
16 Memory circuit
17 Standardization circuit
17-1 First standardization circuit
17-2 Second standardization circuit
18 Optical transmitter
18-1 First optical transmitter
18-2 Second optical transmitter
20 Optical receiver
20-1 First optical receiver
20-2 Second optical receiver
21 Control-signal output circuit (control circuit)
22 Decoding circuit
22-1 First decoding circuit
22-2 Second decoding circuit
30 Clock circuit
30*a* Clock signal
31 Time measuring circuit
32 Synchronization control circuit
32*a* Sampling signal
32*b* Data number
33-1 First abnormality detecting circuit
33-2 Second abnormality detecting circuit
33*a* Abnormality detection signal
34 Switching circuit
35, 35-1, 35-2, 35-3, 35-4, 41, 41-1, 41-2, 41-3, 41-4 Connectors
36 Difference calculating circuit
37 Counting circuit
38 Number-of-clocks calculating unit
39 Synchronization control unit
40 Number output circuit
42 1PPS signal (synchronization signal)
42*a* First 1PPS signal (first synchronization signal)
42*b* Second 1PPS signal (second synchronization signal)
50 Data output unit
P First number of clocks
P1, P11 Second numbers of clocks
P2, P21 Third numbers of clocks
T1*a*, T1*b* Cycles
Ta Clock cycle
Tb, Tb1, Tb2 Sampling cycles
T, T2 times

The invention claimed is:
1. A protection control apparatus comprising a merging unit configured to merge system electric quantities detected in a power system, convert the system electric quantities into digital data, and output the digital data, the protection control apparatus protecting the power system, the protection control apparatus comprising:

the merging unit including:

a control-signal output circuit configured to generate a sampling signal in synchronization with a synchronization signal received from outside and output, as a control signal, numbers cyclically counted up every time the sampling signal is generated and the sampling signal; and a data output unit configured to convert the system electrical quantity into digital data based on the control signal output from the control-signal output circuit and output the digital data, wherein the control-signal output circuit includes:

a number-of-clocks calculating circuit configured to calculate, based on its own clocks of the number-of-clocks calculating circuit, a first number of clocks in time from a minimum to a maximum of the numbers, a second number of clocks in a cycle of the synchronization signal, and a third number of clocks in time from detection of the synchronization signal until the sampling signal is generated; and a synchronization control unit configured to calculate a difference between the first number of clocks and the second number of clocks, control a cycle of the sampling signal based on the difference and the third number of clocks, and synchronize the generation timing of the sampling signal with the synchronization signal.

2. The protection control apparatus according to claim 1, wherein the number-of-clocks calculating circuit calculates, as the second number of clocks, each of a number of clocks in a cycle of a synchronization signal received from a first external device and a number of clocks in a cycle of a synchronization signal received from a second external device and calculates, as the third number of clocks, each of a number of clocks in time from detection of the synchronization signal received from the first external device until the sampling signal is generated and a number of clocks in time from detection of the synchronization signal received from the second external device until the sampling signal is generated, and when an abnormality of the synchronization signal received from the first external apparatus is detected, the synchronization control unit calculates a difference between the first number of clocks and the second number of clocks related to the synchronization signal received from the second external device, controls the cycle of the sampling signal based on the difference and the third number of clocks related to the synchronization signal received from the second external device, and synchronizes the generation timing of the sampling signal with the synchronization signal received from the second external device.

3. The protection control apparatus according to claim 1, wherein the synchronization control unit controls the cycle of the sampling signal in a clock unit of its own synchronization control unit.

4. The protection control apparatus according to claim 1, wherein the synchronization control unit controls the cycle of the sampling signal using, as the synchronization signal, a 1PPS signal received from the GPS (Global Positioning System).

* * * * *